United States Patent [19]

Allen

[11] 3,850,613

[45] Nov. 26, 1974

[54] TREATMENT OF STEEL MILL WASTE DUSTS CONTAINING ZINC

[75] Inventor: John E. Allen, Lake Forest, Ill.

[73] Assignee: Ferro-Carb Agglomeration Ltd., Inc., Chicago, Ill.

[22] Filed: Dec. 19, 1973

[21] Appl. No.: 426,335

Related U.S. Application Data

[63] Continuation-in-part of Ser. No. 359,776, May 14, 1973.

[52] U.S. Cl. ..................................... 75/4, 423/107
[51] Int. Cl. ............................................. C21b 1/28
[58] Field of Search ..................... 75/5, 359, 776, 4; 423/107, 623

[56] References Cited
UNITED STATES PATENTS

| | | | |
|---|---|---|---|
| 1,661,636 | 3/1928 | Simpson | 75/4 |
| 2,310,471 | 2/1943 | Steckel et al. | 423/107 |
| 2,342,368 | 2/1944 | Queneau | 75/4 X |
| 2,863,758 | 12/1958 | Crane et al. | 75/4 |
| 3,262,771 | 7/1966 | Ban | 75/4 X |
| 3,770,416 | 11/1973 | Goksel | 75/3 X |

*Primary Examiner*—A. B. Curtis
*Attorney, Agent, or Firm*—Milton Zucker

[57] ABSTRACT

Steel mill and foundry waste dusts containing zinc and/or lead oxides in addition to iron oxides are briquetted by means of a hydrocarbonaceous binder, together with sufficient carbon to reduce at least the lead and zinc oxides to the metal; the briquettes are preferably preferentially treated with an oxygen-containing gas at 350° to 600°F to selectively react with the binder to obtain strong briquettes; and the briquettes are then heated to a temperature of between 1,800° to 2,500°F to cause any zinc or lead present to first be reduced to metal and be volatilized as metal, and then be oxidized to ZnO and PbO respectively in the gaseous phase. The zinc and lead oxides are recovered from the exhaust gases in an appropriate dust collector while the iron-bearing briquettes are cooled in a nonoxidizing atmosphere, and are then used as ferrous charge in the iron or steelmaking processes.

4 Claims, No Drawings

3,850,613

TREATMENT OF STEEL MILL WASTE DUSTS CONTAINING ZINC

RELATED APPLICATION

This application is a continuation-in-part of my application Ser. No. 359,776, filed May 14, 1973.

BACKGROUND OF THE INVENTION

1. Field of the Invention

This invention is concerned with the control of pollution in steel mill operations, and particularly with the recycling of steel mill wastes containing zinc and/or lead.

2. The Prior Art

Steel mill and foundry operations generally involve the production of liquid pig iron from ore or scrap with coke (ordinarily produced on site) and flux, and conversion of this liquid iron to iron castings or to steel, and the formation of the steel into shapes. Each one of these operations produces particulate solid wastes which must be disposed of by recovery of the metallics for best economics. In the past, the disposal, generally by the sintering process, was a source of pollution and essentially all of the carbon in the waste oxides was consumed.

When the pig iron is converted into steel, in the open hearth, basic oxygen, or an electric furnace, high-iron oxide dusts are produced. However, they too present a serious disposal problem, as a large fraction of this material is submicron in particle size and since about 1.5 tons are produced for each 100 tons of raw steel.

Dumping of these materials is wasteful, as the metallic oxides and carbon units contained therein are valuable. Moreover, the dumping may be prohibited by statute. Sintering has been the most common means of agglomeration for recycling heretofore practiced, but because it involves high temperatures and high gas volume has been a very serious air pollution source. The correction of this problem has resulted in ever increasing cost for construction and operation of pollution control facilities. The sintering process further does not recover the oxides of zinc and lead and, since these elements are detrimental in the iron blast furnace, sinter made from blends containing these elements cannot be used in the conventional iron-making operations. Processes using varying types and amounts of cement have added slag-forming ingredients, and all have displayed a loss of bonding strength at high temperature and also do not remove zinc and lead. It is therefore evident that the most desirable agglomeration should be one which can be operated at low temperatures and low gas volumes in order to provide a low level of pollution. The process should also be capable of recovering valuable ingredients contained in the waste products of a steel plant.

In my copending application Ser. No. 359,776, filed May 14, 1973, of which this is a continuation-in-part, there is described a process for handling wastes such as blast furnace flue dust, mill scale and coke breeze which involves briquetting them with 2 to 15 percent, and preferably about 3 to 8 percent, of a hydrocarbonaceous binder which has a ball and ring softening point below 212°F (ASTM Method: E 28-58T), and heating the briquettes to between 350° and 600°F, for 30 to 90 minutes, in an atmosphere containing at least 10 percent of oxygen, and then cooling to produce briquettes which can be fed into iron- or steelmaking operations, e.g. with blast furnaces, open hearths, electric furnaces and cupolas.

Difficulty is encountered with steel mill dusts which contain more than a few tenths of a percent of zinc and/or lead; when such dusts are briquetted and the briquettes recycled to the blast furnace, the zinc and/or lead in the briquettes tends to react with the refractories used to line the blast furnace and cause their premature failure, apparently due to reaction between these metals and the furnace linings.

The problem becomes more serious, since growing amounts of automobile scrap, or other galvanized iron scrap, are being used in the steelmaking processes. Zinc contents up to 35 percent have been detected in such steelmaking dusts, with the average estimated at about 6.5 percent; lead contents are generally much lower, but are frequently in the range of 0.2 to 2.0 percent. The scrap is generally used in all iron foundry and steelmaking processes, particularly in the basic oxygen process, the basic open-hearth process, or in electric-arc furnaces. Since these processes convert approximately 1.5 percent of the total charged metallics to steel furnace dust which must be disposed of, the problem of recycling these dusts when they contain zinc, lead and iron values is an important one.

OBJECT OF THE INVENTION

This invention provides a method for the recovery and recycling of steel furnace dusts which contain significant amounts of zinc and lead.

STATEMENT OF THE INVENTION

In accordance with the instant invention, steel mill dusts containing significant quantities of zinc or lead or combination thereof are briquetted, together with sufficient carbon to reduce either all metal oxides or at least the oxides of zinc and lead contained in the dust to metals, with 2 to 15 percent, and preferably with 3 to 8 percent, of hydrocarbonaceous binder which has a ball and ring softening point below 212°F (ASTM Method: E 28-58T) and is essentially free of substantial amounts of combustibles volatilizing below 500°F; the briquettes are then heated in a gas containing at least 10 percent of oxygen for 30 to 90 minutes at a gas temperature of between 350° and 600°F, to obtain selective dehydrogenation and oxypolymerization of the briquette binder and thus effect hardening of the agglomerate; the briquettes are then further heated to a temperature of between about 1,800° and 2,500°F for about 10 to 60 minutes, depending on the size of the individual briquettes, with a gas stream through or above the body of briquettes, whereby the carbon in the briquettes reacts to reduce the zinc and lead metal oxides to metallic zinc and lead, which are then volatilized as metal and collected as such or converted to zinc and lead oxides in the gas stream by reacting with free oxygen or carbon dioxide; the exhaust gas stream is passed through an appropriate dust collector to collect the zinc and lead oxides contained therein; and the residue briquettes, now substantially free of zinc and lead and consisting of metallic iron and iron oxides, are cooled in a nonoxidizing atmosphere and recycled to iron- or steelmaking operations.

The preliminary heating with oxygen can be avoided by adding to the mixture being briquetted 5 to 15 percent of water (on a water-free basis). During the formation of the briquettes, the zinc oxide appears to catalyze some reaction between the melted pitch and the dusts, resulting in green briquettes which are strong enough to be fed directly to the high-temperature furnace in which the zinc and lead are volatilized.

DETAILED DESCRIPTION OF THE INVENTION

The process of this invention is useful with steel mill and foundry dusts containing zinc and lead values, and it produces briquettes free of zinc and lead, together with economically valuable zinc and lead oxides. It starts with all sorts of steel mill and foundry wastes, including coke fines, cupola dusts, blast furnace dusts, steel furnace dusts and mill scale, where any of the raw materials contain a significant amount of zinc or lead.

The fines are mixed in some convenient mixer (e.g., a pug mill) with the binder selected. The binder should be hydrocarbonaceous, have a ball and ring softening point (ASTM Method: E 28-58T) of below about 212°F (for convenience in handling) and be free of substantial amounts of combustibles volatile at 500°F. Typical useful binders include coal tars and pitches, petroleum residue pitches or petroleum reforming bottoms, and the like. I have used tars with a 100°F softening point, and a viscosity of 5 relative to water, and pitches with softening points approaching 212°F; it is merely necessary to use a mixing temperature appropriate to the binder used, not exceeding about 75°F above its softening point; the binder need only be liquid enough to mix well with the dust. The presence of substantial amounts of naphthalene (or other combustibles volatilizing below 500°F) must be avoided because it will cause fires to occur in the dehydrogenating oven, with loss of process control.

At least 2 percent of binder is needed to get sufficient strength in the final briquettes for any purpose — at about 3 to 8 percent, optimum results are obtained. Up to 15 percent of binder may be used without penalty; binder levels above 15 percent not only add to process cost but tend to cause softening and deformation in the early stage of dehydrogenation.

The dust and binder are thoroughly mixed, as in a pug mill, at any suitable mixing temperature which produces a liquid binder, but not in excess of about 75°F above the softening point of the binder. Higher temperatures are avoided to insure setting of the raw briquettes sufficiently to prevent deformation in the dehydrogenation step. Mixing is generally complete in 5 to 10 minutes, depending on the formulation and equipment used.

Carbon should be present in the briquettes in sufficient quantity to at least reduce any zinc or lead oxides present to the metallic state. Since only 12 pounds of carbon are needed to reduce 162 pounds of zinc oxide to metal and carbon dioxide, and the same amount of carbon will reduce 440 pounds of PbO, it is obvious that very little carbon need be present even with dusts having the highest zinc oxide content. A typical blast furnace dust contains much more than enough carbon to reduce an equal weight of typical open-hearth dust containing zinc. In general, there is enough carbonaceous waste about a steel mill so that the briquettes produced contain enough carbon to reduce the iron oxides in the briquettes to iron at the temperatures employed in the instant process, as well as the zinc and lead oxides.

The mix is formed into shapes by extrusion, or by compaction as with a piston press, such as the Milwaukee type, or most preferably by roll-briquetting. The size of briquette made is dictated by the particular recycle equipment to be used and the application of the agglomerate. Blast furnaces are preferably charged with 2 inch briquettes; cupolas (e.g., a Whiting 4 to 8 foot diameter cupola) prefer larger briquettes (4 × 4 × 2 inches), while electric furnaces, open hearths and basic oxygen converters require somewhat smaller sizes than the blast furnace.

The raw briquettes are transferred from the forming device to the dehydrogenation oven. There, the briquettes are treated in a stream of oxygen-containing gas circulating at a temperature of 350° to 600°F for a time sufficient to cause substantial dehydrogenation and polymerization of the binder and reaction between the binder and the iron-bearing dust to form a firm bond.

Any type of furnace may be used for the dehydrogenation. Typically, I use a chain grate carrying a bed of briquettes about 12 inches high, with heated air as the oxygen-containing gas. The reaction is rather slow at 350°F gas temperature, but is complete in about 90 minutes at 10 percent binder content, and in about 60 minutes at 5 percent binder content. At gas temperatures of 600°F, extreme care must be taken, but high speed of reaction obtains - as low as 30 minutes at 3 percent binder content. For optimum results, I prefer to operate at gas temperatures of about 400° to 500°F.

The reaction of the oxygen in the gas with the hydrogen in the binder is highly exothermic, producing about 300 to 350 BTUs per pound of binder. The air forced through the bed not only provides the oxygen, but acts to remove this heat of reaction. With a typical 12 inch high bed, the velocity necessary to remove this heat is between 3 and 10 feet per second (i.e., below 3 feet per second, fines occur, while above 10 feet per second the reaction tends to stop). The minimum $O_2$ content of the gas used for dehydrogenation is about 10 percent, although I prefer to operate with 15 percent or more of oxygen.

In the dehydrogenation, the binder is carbonized to form a structure which is sufficiently strong to hold the briquette together under the forces of handling and final processing. In the absence of at least 5 percent of iron in the dust, such a dehydrogenated briquette, with 3 to 8 percent of binder, would have a crushing strength lower than is desirable. Since my briquettes are normally very strong, resisting force of from about 800 to 5,000 pounds per square inch, it seems clear that the iron present is essential for the production of satisfactory briquettes.

The partially dehydrogenated briquettes burn with a yellow flame, which is useful in open-hearth furnace operations. When recycled in this fashion, the recovery of iron and carbon values in the briquettes, and the improvement in furnace operations, appear to result in the disposal of the wastes with an economic advantage.

With dusts containing zinc oxide, it is not necessary to partially dehydrogenate the bitumen bonded briquettes. When such dusts are briquetted as described above, at temperatures between about 150° and 210°F, in the presence of about 5 to 15 percent of water (anhydrous basis), a reaction appears to occur during the briquetting operation, so that the green briquettes are strong enough to be fed directly to the zinc recovery system, without the need for heating in oxygen. I do not know just what reaction occurs to cause the hardening of the briquettes. In the absence of zinc oxide or of water, the green briquettes are not strong enough for further processing without heating in oxygen.

The briquettes, made by either process, are characterized by being strong enough to be handled commercially, and to be charged to the high-temperature furnace without disintegrating. They are fed into any convenient type of furnace, where they are heated to a temperature from about 1,800° to 2,500°F. Muffle furnaces, hearth furnaces, continuous grate and shaft furnaces including kilns may all be used.

In the furnace, the zinc and lead oxides react with the carbon in the briquettes to form zinc and lead metals, which volatilize. If sufficient carbon is present, the iron oxides may also be reduced to iron. The time required to complete the reaction depends on the temperature and briquette size; it is necessary that the interiors of the individual briquettes reach zinc volatilization temperature. At 2,500°F, with small briquettes, 5 to 10 minutes are ample; in general, 10 to 30 minutes is a commercial range of time. Longer times are uneconomic, but may be necessary with very large briquettes at lower temperatures, especially where heat transfer may be slow, as in a muffle. Here, times up to 60 minutes may be necessary. With a sweep of gas through the bed of briquettes, obviously heat transfer is better, and times are minimized.

As the zinc vapor is transported by the gas stream at these elevated temperatures, it oxidizes to zinc oxide, either reacting with oxygen present in the stream or in the dust collectors, or reacting with carbon dioxide in the gas stream to form zinc oxide and carbon monoxide. I prefer to operate with some oxygen in the gas used, whether it is in the atmosphere above the charge in the muffle or similar furnace or in a gas stream flowing through a bed of the briquettes in a shaft furnace. In a muffle furnace, I can introduce air into the space above the charge, although I prefer to operate with air tempered with the gas to about 15 percent or less of oxygen to reduce control problems.

In a shaft furnace, the gas fed through the charge should preferably be an oxidizing flue gas, or some mixture thereof with air, to avoid control problems. However, the amount of oxygen is limited only by the control problems, and is not critical; a neutral flue gas can be used.

EXAMPLES OF THE INVENTION

The following examples of the invention are given by way of illustration and are not to be deemed limiting:

EXAMPLE 1

A 1,000 gram mix containing the following quantities of the components was made and formed to green shapes 1 ⅛ inches in diameter by 1 inch high, as shown:

250 grams of coke breeze ground to pass the Tyler No. 8 screen
750 grams of open-hearth dust, containing approximately 10 percent of zinc and less than 1 percent of lead (calculated as metals, but present as oxides) passing the Tyler No. 60 mesh screen
75 grams of coke oven tar roofing pitch with a viscosity of 145°F softening point, ASTM standard ball and ring method.

The solid ingredients were first heated to 180°F and the pitch to 170°F. These were blended in a bench-size "Hobart Kitchen Mixer" for 10 minutes and then formed to the shape indicated in a Carver press using 10,000 psig as the forming force. The briquettes so produced were air-baked for 90 minutes in an air-circulating oven maintained at 470°F temperature, using 21 percent oxygen concentration (air). At the end of 90 minutes, these air-baked shapes were calcined at 2,000°F for 20 minutes in a muffle furnace equipped to have hot gas containing 13 percent of oxygen enter the gas stream above the shapes. An off-gas cooling and solids separator permitted collection of the crude mixture of zinc oxide and lead oxide formed.

The air-baked briquettes crushed at 3,000 psig.

The residual calcined pellets were cooled and withstood hard handling. On crushing at 5,000 psig, these residues formed a dense compact essentially free of zinc and lead.

EXAMPLE 2

Example 1 was repeated, but the mix was changed as follows:
500 grams of blast furnace flue dust (100 percent –60 Tyler mesh)
500 grams of open-hearth dust (100 percent –60 Tyler mesh) as in Example 1
75 grams of the pitch as in Example 1
150 grams of water.

The resulting green shapes were divided into two portions. The first portion was air-baked and calcined as in Example 1. The second portion was calcined without air-baking. The air-baked product crushed at 4,100 psig. In both cases, crude zinc oxide was recovered from the off-gases collected from calcining at 2,000°F for 20 minutes and the residual pellets formed a zinc- and lead-free metallic compact when compressed at 5,000 psig.

EXAMPLE 3

The following mix, at 190°F, was formed to briquettes 1 × 1 × 1½ inches on a roll press at 5,000 pounds per linear inch of roll width forming pressure:

30 pounds of water
150 pounds of iron cupola dust containing 10 percent of zinc metal and 1 percent of lead metal, in the form of oxides
75 pounds of blast furnace flue dust
75 pounds of ground coke breeze
23 pounds of pitch as in Examples 1 and 2
353 pounds of total green mix.

At ambient temperature, these green briquettes withstood a compressive force of 700 pounds before destruction. They were dust-free and easily transported, with only slight attrition.

Some of these shapes were calcined directly as in Example 2; crude zinc oxide was recovered and the briquette residue was whole, sintered and strong.

The remainder was air-baked as in Example 1. The air-baked product crushed at 1,100 pounds of total force. On calcining as in Example 1, crude zinc oxide was collected from the off-gas stream and the calcined residue was a well shaped, sintered briquette which formed a metallic mass on compaction.

EXAMPLE 4

325 parts of basic oxygen furnace dust and 375 parts of open-hearth dust containing on the average 10.2 percent of zinc in the form of zinc oxide were blended with 25 parts by weight of coke breeze ground to −10 mesh. After dry-blending, 6 parts of liquefied coal tar pitch (as in Example 1) were added at a temperature of 160°F and the blending continued for 3 more minutes. The blend was then air-baked as described in Example 1, and the briquettes were heated in flue gas on a continuous grate type furnace in which the maximum temperature reached was 2,175°F. The exiting fumes of zinc oxide were collected in the baghouse and the residual briquettes were discharged cold.

EXAMPLE 5

Seventy-two parts of open-hearth dust analyzing 17.5 percent of zinc were blended with 28 parts of char prepared from Montana coal. The char analyzed 80 percent of fixed carbon, 14 percent of volatile matter and 6 percent of ash. It was sized to −20 mesh. Five parts were added in form of a molten asphaltic bitumen (residue from a petroleum refinery) with a ball and ring softening point of 160°F, and after 4 minutes of blending in a double-shaft pug mill the blend was briquetted on a conventional press to 1 inch briquettes and air-baked as described in Example 1.

The cured briquettes were subsequently heat-treated under nonoxidizing conditions in a beehive-type brick kiln at a maximum temperature of 2,000°F. The gases exiting from the kiln were collected in a baghouse and the zinc oxide precipitated. The reduced iron briquettes were cooled and may be used in an electric foundry operation.

Obviously, the examples can be multiplied indefinitely without departing from the scope of the invention as defined in the claims.

I claim:

1. In the operation of steel mills and iron foundries, the method of disposing of iron- and carbon-containing wastes which also contain zinc oxide to obtain a product containing the iron in the wastes without the zinc and zinc oxide which comprises (1) mixing the particulate waste with a bituminous binder having a ball and ring softening point below 212°F and being free of combustibles volatile at 500°F, and with sufficient added carbonaceous solid to reduce any zinc oxide present to zinc metal, to produce a mix containing between 2 and 15 percent of binder; (2) briquetting the mix; (3) treating the briquettes to ensure sufficient mechanical strength to feed the briquettes to (4) a heating step where the briquettes are heated at 1,800° to 2,500°F for a time sufficient to reach the volatilization temperature of all the zinc contained therein, whereby any zinc oxide present is converted to zinc metal and the zinc metal is converted to zinc vapor; (5) removing the zinc vapor from the vicinity of the briquettes with a gas stream containing a reactant which converts the zinc vapor to zinc oxide; and (6) recovering the zinc oxide.

2. The process of claim 1, in which the briquettes are strengthened by heating them in a gas containing at least 10 percent of oxygen for 30 to 90 minutes at a gas temperature of 350° to 600°F to selectively remove hydrogen from the binder.

3. The process of claim 1, in which the briquettes are strengthened by adding 5 to 15 percent of water, on an anhydrous basis, to the mix before briquetting, whereby strong briquettes are obtained without further heating.

4. The method of claim 1, in which the binder content is between 3 and 5 percent.

* * * * *